United States Patent [19]
Hauff

[11] Patent Number: 4,768,024
[45] Date of Patent: Aug. 30, 1988

[54] APPARATUS FOR MONITORING FIRE HAZARDS IN A BUILDING

[76] Inventor: Werner Hauff, Herlsbühlstr. 19, D-7925 Ballmertshofen, Fed. Rep. of Germany

[21] Appl. No.: 885,863

[22] Filed: Jul. 15, 1986

[30] Foreign Application Priority Data

Jul. 18, 1985 [DE] Fed. Rep. of Germany ....... 3525644

[51] Int. Cl.$^4$ ............................................. G08B 17/00
[52] U.S. Cl. ................................. 340/584; 174/152 G
[58] Field of Search ........ 340/584, 693, 289, 590-591; 169/61; 174/53, 65 R, 152 G, 151

[56] References Cited

U.S. PATENT DOCUMENTS

| | | | |
|---|---|---|---|
| 3,952,809 | 4/1976 | Osborne | 340/289 X |
| 4,319,234 | 3/1982 | Rice | 340/693 X |
| 4,520,348 | 5/1985 | Swanson | 340/590 X |
| 4,627,647 | 12/1986 | Hauff | 285/189 |
| 4,646,486 | 3/1987 | Hauff | 52/1 |
| 4,703,136 | 10/1987 | Hauff | 174/152 G |

FOREIGN PATENT DOCUMENTS 3419352 11/1985 Fed. Rep. of Germany.
3425429 1/1986 Fed. Rep. of Germany.

Primary Examiner—Glen R. Swann, III
Assistant Examiner—Thomas J. Mullen, Jr.
Attorney, Agent, or Firm—Herbert Dubno; Ronald Lianiides

[57] ABSTRACT

The apparatus for detection of fire in a building includes at least one duct for at least one cable, particularly an electrical cable, through a wall opening in one of the walls of the building. The duct having two sealing members sealing the wall opening on both sides of the wall against the cable and the wall of the cable-feed passage is a fire retardant seal, by which the line of the cable is sent between different fire zones separated by the wall from each other while preventing the spread of fire between the fire zones. At least one electrical temperature sensor is mounted inside of the duct and at least one electrical connecting conductor connecting the temperature sensor and a detection device for direct detection of a sensor signal from the temperature sensor is guided from the interior of the duct to the wall and is fire protected in the wall. The duct with the sensors and the connecting conductors are embedded in the wall of the building during its manufacture. Additional sensors including smoke or gas detectors and a plurality of variously positioned temperature sensors can also be provided.

12 Claims, 1 Drawing Sheet

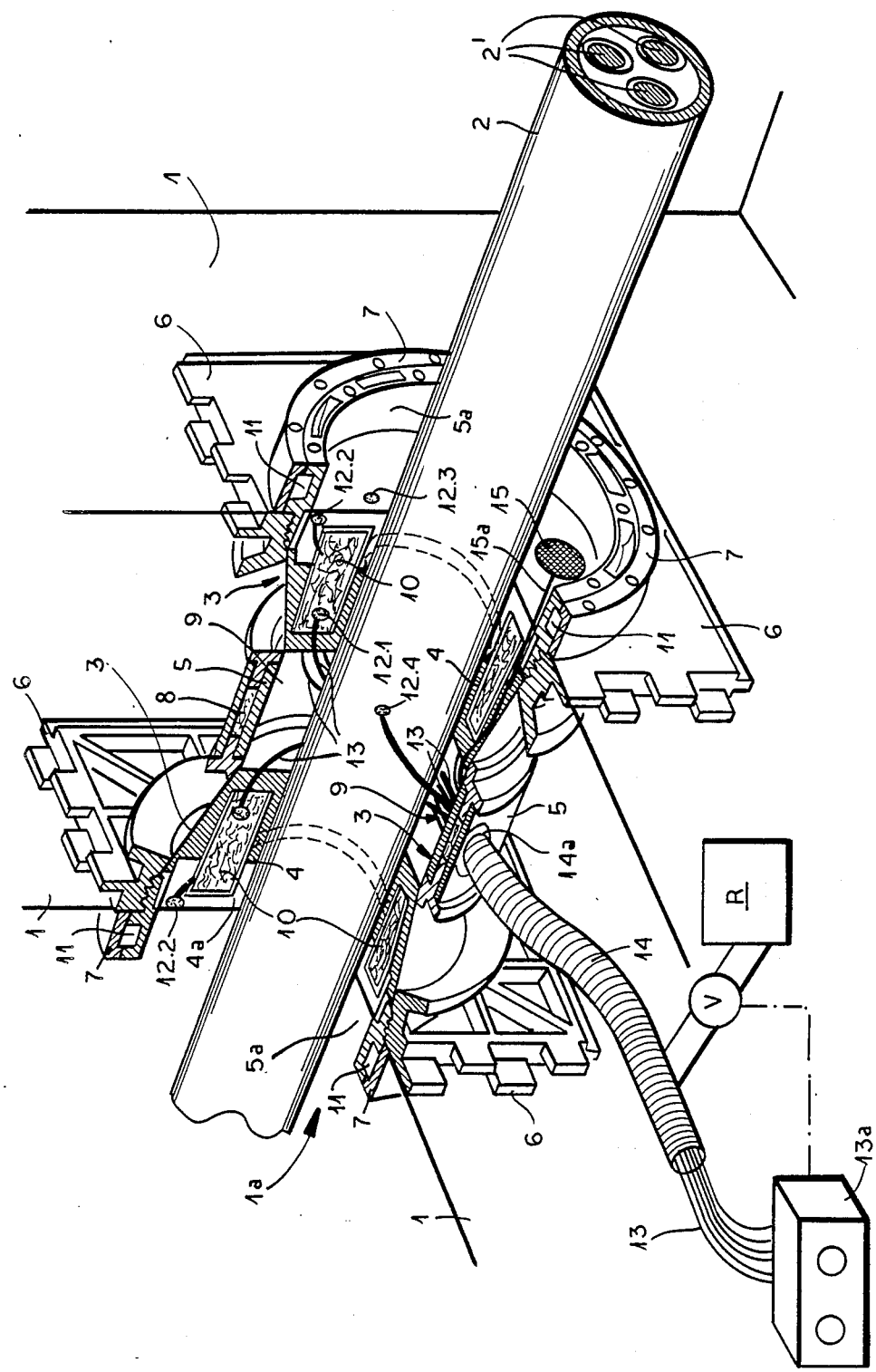

APPARATUS FOR MONITORING FIRE HAZARDS IN A BUILDING

CROSS REFERENCE TO RELATED APPLICATIONS

This application is related to the commonly assigned copending applications: Ser. No. 774,609 filed Aug. 29, 1985 and issued Oct. 27, 1987 as U.S. Pat. No. 4,703,136; Ser. No. 707,877 filed Mar. 4, 1985 and issued Dec. 9, 1986 as U.S. Pat. No. 4,627,647; and Ser. No. 704,703 filed Feb. 25, 1985 and issued Mar. 3, 1987 as U.S. Pat. No. 4,646,486.

FIELD OF THE INVENTION

My invention relates to an apparatus for monitoring fire hazards in a building and, more particularly, to an apparatus for detection of fire in conjunction with a duct for an electrical cable in a building.

BACKGROUND OF THE INVENTION

One known apparatus for detection of fire in a building comprises a duct for at least one cable, particularly an electrical cable, through a wall opening in one of the walls of the building. The cable duct has two sealing members sealing the wall opening on opposite sides of the wall. They seal against the cable on the one hand and the wall surface of the passage or pass-through on the other hand and form a fire retardant seal, through which the cable can pass between different fire zones separated from each other by the wall of the building and which isolates these fire zones from each other with respect to the possible spread of a fire.

Cable pass-through or ducts which retard the spread of a fire have already been disclosed, for example in German Patent documents Nos. 34 19 352 and 34 25 429. These ducts are either completely or partly embedded in the wall during its manufacture. Particularly it is possible to mount the duct between the walls of a form for a concrete wall so that it is sealed flush with the wall surfaces in the freshly made wall after removal of the form.

Furthermore apparatus for detection of fire in buildings is known in different forms. It is most common to provide temperature, smoke and/or gas detectors or the like at suitable positions in the spaces to be watched which supply electrical signals which are fed by connecting conductors to a detection device.

Besides emitting of the usual alarm signals by such apparatus, automatic mechanisms and/or devices for fire fighting, particularly sprinkler systems or the like can be activated and can be controlled as may be necessary.

The installation of the fire detection mechanisms occurs as soon as possible after the positioning of the wall framework and is associated with a considerable mounting expense. It is also disadvantageous that the connecting conductors between the sensors and the detection device run either only on an outside of the wall or under plaster, and thus can be relatively readily exposed to the action of a fire and are very sensitive to damage due to fire. This is also true for the sensors.

OBJECTS OF THE INVENTION

It is an object of my invention to provide an improved apparatus for monitoring fire hazards in a building.

It is a further object of my invention to provide an improved apparatus for detection of fire in a building which is particularly simple and inexpensive.

It is also an object of my invention to provide an improved apparatus for detection of fire in a building in which the temperature is detected at particularly sensitive positions where any fire developing can be detected early in its formative stages.

It is yet another object of my invention to provide an improved apparatus for detection of fire in a building which has as complete a fire resistance as possible so that it has a long life during a fire and the detection signal produced by the sensors can be delivered as long as possible or as long as the entire duration of the fire.

SUMMARY OF THE INVENTION

These objects and others which will become apparent hereinafter are attained in accordance with my invention in an apparatus for detection of fire in a building comprising at least one duct cable feedthrough or pass-through for at least one cable, particularly an electrical cable, through a wall opening in a wall of the building. The duct has two sealing members sealing the wall opening on both sides of the wall against the cable and the surrounding wall of the pass-through and forms a fire retardant seal through which the line of cable is sent between different fire zones separated by the wall from each other to retard the spread of fire between the fire zones.

According to my invention at least one electrical temperature sensor is mounted inside of the duct and at least one electrical connecting conductor connecting the temperature sensor and a detection device for direct detection of a sensor signal from the temperature sensor is guided from the interior of the duct into the wall and is fire protected in the wall.

The effect of mounting temperature sensors inside of the duct is that the temperature of the cable and/or cables are detected in a special way. This temperature is a particularly sensitive indicator of the presence of fire, since the temperature increase at any of the positions along the cable, particularly of an electrical cable, is conducted immediately along the cable which has a particularly good heat conductivity, so that the sensor responds at a very early stage of development of a fire. Since, further, the temperature sensor is found inside the fire protected duct and the connecting conductor runs directly inside of the duct from deep inside of the wall to the detection position, the duration of the detection in case of fire is optimally long, namely substantially equal to the life of the fire resistant duct, while the connecting conductors are protected as completely as possible inside of the wall of the building. Sensors an connecting conductors can thus not be prematurely destroyed in a developing fire.

Important to the invention is the particularly simple mounting and installation of the apparatus according to my invention. That is because the duct with its sensors and the connecting conductors connected to them are already embedded in the wall during the making of the wall of the building.

Thus particularly for a concrete wall the duct and sensors and connecting conductors are already placed in the form before pouring of the wall so that the connecting conductors above all run deep inside the completed wall which is not possible with connecting conductors installed after the concrete wall has been made. Besides no special mounting or laying costs arise as is unavoidable with subsequent mounting in the completed wall of the building.

A temperature sensor can be provided in one of the sealing members or each sealing member can have its own temperature sensor. The sensor then may be put in thermal contact with the cable by the sealing member. The thermally conductive bridge formed by the sealing body can be very short when the temperature sensor is as close as possible to the cable cavity in the sealing member for the cable.

Furthermore it is possible to provide each sealing body with a plurality of temperature sensors and to mount one of these temperature sensors on the exterior front surface of the sealing member. This final temperature sensor can respond then also to the space temperature alone and of course the space temperature of that space in the building which is facing the outer front surface of the sealing member having the sensor.

Moreover the temperature sensor and/or one of the other temperature sensors of the plurality of temperature sensors are mounted in the intermediate space axially between the sealing members and radially between the wall of the cable-feed passage and the cable. The sensor can thus also sit directly on the cable and be in direct thermal contact with it.

A conductor tubing for the connecting conductors can be embedded in the wall of the building and open directly inside the duct through the wall. The conductor tubing can be composed of a plastic material and the connecting conductors protected from direct contact with sheathing found in the wall of the building.

The conductor tubing can fulfill an additional heat stopping protective function for the connecting conductors. Advantageously the mouth of the conductor tubing lies in the intermediate space between the sealing members so that the connecting conductors in the duct can be guided in an easy way to the sensors positioned at different places in the duct. The duct can have a soffit pipe between the sealing members so that the mouth of the conductor tubing is in the wall of the soffit pipe. The conductor tubing can also improve the fire retardant capacity of the duct. The conductor tubing can be provided with a reservoir for supplying a fire retardant and the fire retardant in case of fire after activation may be fed through the conductor tubing into the duct.

Additional sensors such as gas or smoke detectors can advantageously be provided in the duct on the outer front surface of its sealing members and their connecting conductors run to the detection device like those for the temperature sensors inside the wall of the building.

BRIEF DESCRIPTION OF THE DRAWING

The above and other objects, features and advantages of my invention will become more readily apparent from the following description, reference being made to the accompanying highly diagrammatic drawing in which the sole FIGURE is a partially cutaway perspective view of an electrical duct through a wall of a building provided with an apparatus for detection of fire according to my invention.

SPECIFIC DESCRIPTION

The drawing shows a part of an apparatus for detection of fire mounted in a wall 1 of a building. In the wall 1 there is a duct for an electrical cable 2, namely an electrical cable 2 with three electrical conductors 2'

The duct in this embodiment is designed for only a single electrical cable 2, however it can also be constructed for a plurality of such cables. In this case the sealing members 4 filling the space between the electrical cable 2 and the soffit or inside 3 of the wall opening 1a have an opening 4a for the cable 2 which adjusts to or fits the cable cross section.

The duct comprises a soffit pipe or liner 5 in the wall opening 1a and the sealing members 4 filling the space at both ends of the soffit pipe or liner 5 between the cable 2 and the soffit or inside 3 of the wall opening 1a which seal against the cable 2 on the one hand and the soffit 3 of the wall opening 1a on the other hand.

The electrical duct further comprises a casement 6 which forms a part of the soffit 3 of the wall opening 1a and which forms an elastic compressible device for receiving the sealing members 4 associated with it in the wall opening 1a. The soffit 3 is tapered from the wall exterior to the interior like a truncated cone or frustocone.

In this tapered part of the wall opening 1a the sealing members 4 are axially braced by a compressible ring 7 forming a pressing device which is screwed into an internal thread inside of the casement 6 inserted in the wall 1. The soffit pipe or liner 5 is hollow walled and the hollow space 8 filled with fire retardant material indicated by dots in the drawing which decomposes or evaporates when heated during a fire and gives off a flame retardant gas. The soffit pipe or liner 5 is provided with a normally closed passage not shown in the drawing which connects the hollow space 8 with an intermediate space 9. However it is closed until activated and opened by the heat of a fire.

Also in the sealing members 4, the casement 6 and the compressible ring 7 forming the pressing device for mounting the sealing members 4, hollow spaces 10 and 11 opening into the cable opening and/or to the sealing member 4 are provided which also are filled with a fire retardant material. As a result the electrical duct is a fire retardant seal through which the line of cable 2 is partitioned into fire zones separated by the wall 1.

Electrical temperature sensors 12.1, 12.2, 12.3 and 12.4 are mounted in this duct for detection of fire in these fire zones. The electrical connecting conductors 13 connect these temperature sensors to a detection device 13a which acts to detect the sensor signals and are guided directly from the interior of the duct into the wall 1 and run deep inside of it. Both the temperature sensors 12.1 to 12.4 and also its connecting conductors 13 are protected exteriorly against the effects of fire.

In the detection device 13a the detection signal can be processed in different ways for example for detection of heating of the individual cable, for reporting the critical sealing member temperature, for control of a foam making device for fighting fire, for control and activation of a fire retardant material in the packing and control of cooling means or the like.

In the embodiment shown in the drawing, the temperature sensors 12.1, 12.2 and 12.3 are provided at several places in both sealing members 4. For example the temperature sensor 12.3 is mounted in the outer front surface 5a of the sealing members 4 so that it detects the room temperature on the outside of the wall 1. Additional temperature sensor 12.1 is found in the hollow cavity 10 of the sealing members 4 and it measures the temperature of the fire retardant material found in them. An additional temperature sensor 12.4 is positioned in the intermediate space 9 axially between the sealing members 4 and radially between the cable 2 and the soffit 3 of the wall opening 1a in the wall 1.

Particularly this sensor 12.4 can be put directly in the cable 2 and thus would be in direct thermal contact with the cable 2.

In the wall 1 of the building there is a conductor tubing 14 for the connecting conductors 13 which opens directly into the cable duct at one end and on its other end is shown cutaway in the direction of the detection device 13a. The mouth 14a of the conductor tubing 14 is in the intermediate space 9 between the sealing members 4, wherein the conductor tubing 14 penetrates the soffit pipe 5 between the sealing member 4 and the hollow space 8 provided in the soffit pipe 5. Thus the connecting conductors 13 extending from the mouth 14a of the conductor tubing 14 can be guided simply to the sensors 12.1 to 12.4 positioned at different places in the duct. Moreover the conductor tubing 14 can be connected with a valve V of a reservoir R for fire retardant material and the fire retardant material can be delivered to the intermediate space 9 of the duct through the conductor tubing 14 for example by blowing or forcing in after activation in case of a fire according to the situation.

Also in this embodiment additional sensor 15, which may be a gas or smoke detector, is provided at the duct on the outer front surface 5a of its sealing members 4. Its connecting conductor 15a runs to the detection device 13a like those for the temperature sensors 12.1 to 12.4 directly from the front surface 5a into the wall 1 and also in the conductor tubing 14.

The duct shown in the drawing with the conductor tubing 14, the temperature sensors 12.1 to 12.4 and the smoke or gas detector 15 and with the connecting conductors 13 and 15a before manufacture of the wall 1 and also with the casement 6 (however without the compressible ring 7) is positioned for example between the form members of the wall form needed to erect a concrete wall 1 and mounted so that after pouring the wall 1 in the form space the duct in its casement 6 is sealed flush with the outside wall 1.

The connecting conductors 13 and 15a in the conductor tubing 14 run deep in the interior of the concrete wall 1.

Should a fire break out on one side of the wall 1, the heating of the conductor 2 proceeds along the metallic conductive cable elements 2' quickly in the cable duct where it is detected by the sensors 12.1 to 12.4. Because of the high fire resistance on the one hand of the duct and on the other hand of the wall the temperature sensors 12.1 to 12.4 and the connecting conductors 13 and 15a are completely protected from destruction by the fire.

I claim:

1. An apparatus for monitoring fire hazard in a building comprising:
   at least one duct for at least one cable, particularly an electrical cable, extending through a wall opening in a wall of said building, said duct having two sealing members sealing said wall opening on opposite sides of said wall against said cable and the interior of said wall opening to form a fire retardant seal through which said cable passes between different fire zones of said building separated by said wall from each other and which retards the spread of fire between said fire zones;
   at least one electrical temperature sensor mounted inside of said duct; and
   at least one electrical connecting conductor connecting said at least one temperature sensor with a detection device for direct detection of a sensor signal from said at least one temperature sensor which is guided from the interior of said duct into said wall and is fire protected in said wall.

2. The apparatus defined in claim 1 wherein one of said temperature sensors is provided in one of said sealing members.

3. The apparatus defined in claim 1 wherein one of said temperature sensors is provided in each of said sealing members.

4. The apparatus defined in claim 1 wherein each sealing member is provided with a plurality of said temperature sensors and one of said temperature sensors is mounted on the outer front surface of at least one of said sealing members.

5. The apparatus defined in claim 4 wherein one of said temperature sensors is mounted in an intermediate space axially between said sealing members and radially between said interior of said wall opening and said cable.

6. The apparatus defined in claim 5 wherein a conductor tubing receiving said connecting conductors is provided in said wall and has a mouth opening directly into said duct.

7. The apparatus defined in claim 6 wherein said mouth of said conductor tubing opens in said intermediate space between said sealing members.

8. The apparatus defined in claim 7 wherein said duct has a liner between said sealing members and said mouth of said conductor tubing is in a wall of said liner.

9. The apparatus defined in claim 8 wherein said conductor tubing is connected with a reservoir for a fire retardant material and said fire retardant material, which is released in case of fire, can be fed through said conductor tubing into said duct.

10. The apparatus defined in claim 9 wherein at least one additional sensor is provided at said duct on said outer front surface of said sealing members and a connecting conductor connects each of said additional sensors to said detection device and runs in said conductor tubing.

11. The apparatus defined in claim 10 wherein each of said additional sensors is a gas or smoke detector.

12. An apparatus for detection of fire in a building comprising:
   at least one duct for at least one electrical cable;
   a wall opening formed in a wall of said building for said duct;
   two sealing members sealing said wall opening on opposite sides of said wall against said cable and the interior of said wall opening;
   a plurality of temperature sensors mounted inside of said duct, one of which is mounted on one of the outer front surfaces of said sealing members, and another of which is positioned in an intermediate space axially between said sealing members and radially between said cable and said interior of said wall opening;
   at least one additional sensor for detection of smoke or gas;
   a detection device for direct detection of a sensor signal from said temperature sensor and said additional sensors;
   at least one electrical connecting conductor connecting said temperature sensor or said additional sensors and said detection device guided from the interior of said duct into said wall so as to be at least partially fire protected; and
   a conductor tubing in the interior of said wall having a mouth opening into said intermediate space in which said electrical connecting conductors pass from said temperature sensor and said additional sensors to said detection device.

* * * * *